US012623569B2

(12) United States Patent
Ide et al.

(10) Patent No.: US 12,623,569 B2
(45) Date of Patent: May 12, 2026

(54) SYSTEM, METHOD, AND COMPUTER-READABLE STORAGE MEDIUM

(71) Applicant: HONDA MOTOR CO.,LTD., Tokyo (JP)

(72) Inventors: Tatsuya Ide, Saitama (JP); Fumitaka Koide, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 427 days.

(21) Appl. No.: 18/470,435

(22) Filed: Sep. 20, 2023

(65) Prior Publication Data

US 2024/0106266 A1      Mar. 28, 2024

(30) Foreign Application Priority Data

Sep. 28, 2022    (JP) ................................. 2022-155614

(51) Int. Cl.
 B60L 55/00          (2019.01)
 B60L 53/62          (2019.01)
 H02J 13/00          (2006.01)
(52) U.S. Cl.
 CPC .............. B60L 55/00 (2019.02); B60L 53/62 (2019.02); H02J 13/00002 (2020.01)
(58) Field of Classification Search
 CPC .... H02J 13/00002; B60L 53/62; B60L 55/00; Y02T 10/70; Y02T 10/7072; Y02T 90/12
 See application file for complete search history.

(56) References Cited

U.S. PATENT DOCUMENTS

| | | | |
|---|---|---|---|
| 11,383,611 B2 | 7/2022 | Hishida | |
| 2018/0218459 A1 | 8/2018 | Yokoyama | |

(Continued)

FOREIGN PATENT DOCUMENTS

| | | | |
|---|---|---|---|
| JP | 6534403 | B2 | 6/2019 |
| JP | 2021093831 | A | 6/2021 |

(Continued)

OTHER PUBLICATIONS

Office Action issued for counterpart Japanese Application No. 2022-155614, transmitted from the Japanese Patent Office on Sep. 2, 2025 (drafted on Aug. 27, 2025).

(Continued)

*Primary Examiner* — Mong-Shune Chung

(57) ABSTRACT

A system includes: a first acquisition module which acquires information indicating a driving-scheduled period of a plurality of vehicles each including a battery and a driving characteristic of a driver who drives each of the plurality of vehicles in the driving-scheduled period; a second acquisition module which acquires information indicating a power transfer-scheduled period during which power transfer is to be performed between the battery included in at least one vehicle of the plurality of vehicles and a power grid; and a selection module which specifies, on the basis of the driving-scheduled period, the driving characteristic, and the power transfer-scheduled period, a driving characteristic of a driver of a vehicle to be driven within a predetermined period from the power transfer-scheduled period, and selects, on the basis of the driving characteristic being specified, a vehicle of which a battery is used for power transfer from/to the power grid.

20 Claims, 12 Drawing Sheets

(56)  References Cited

U.S. PATENT DOCUMENTS

| | | | |
|---|---|---|---|
| 2021/0046842 A1* | 2/2021 | Polania Castro | ....... B60L 53/65 |
| 2021/0122260 A1 | 4/2021 | Kazuno | |
| 2021/0170902 A1 | 6/2021 | Tsuchiya | |
| 2023/0141525 A1* | 5/2023 | Eitzer | ................. H01M 10/482 |
| | | | 320/109 |
| 2023/0158921 A1 | 5/2023 | Iida | |
| 2023/0302937 A1* | 9/2023 | Takasaki | ......... G08G 1/096811 |

FOREIGN PATENT DOCUMENTS

| | | | | |
|---|---|---|---|---|
| JP | 2021176063 A | 11/2021 | | |
| JP | 2022027238 A | 2/2022 | | |
| JP | 7068852 B2 | 5/2022 | | |
| KR | 20210148759 A | * 12/2021 | ............. | G06Q 50/06 |

OTHER PUBLICATIONS

Extended European Search Report for counterpart European Application No. 23198571.4, issued by the European Patent Office on Feb. 23, 2024.

* cited by examiner

| USER | POWER CONSUMPTION RATE | | |
|---|---|---|---|
| | VEHICLE TYPE 1 | VEHICLE TYPE 2 | VEHICLE TYPE 3 |
| A | 165 | 154 | 187 |
| B | 143 | 133 | 162 |
| C | 173 | 161 | 196 |
| D | 158 | 147 | 179 |
| . . . | . . . | . . . | . . . |

*FIG.5*

| USER | TIME CHANGE | VEHICLE TYPE CHANGE | VEHICLE TYPE DESIGNATION | DEPARTURE PLACE | DESTINATION | DEPARTURE MOMENT | ARRIVAL MOMENT | STAY TIME |
|------|-------------|---------------------|--------------------------|-----------------|-------------|------------------|----------------|-----------|
| A | ALLOWA-BLE | ALLOWA-BLE | VEHICLE TYPE 1 | OFFICE | BRANCH 1 | 12:45 | 12:55 | 10 |
| A | ALLOWA-BLE | ALLOWA-BLE | VEHICLE TYPE 1 | BRANCH 1 | OFFICE | 13:05 | 13:15 | - |
| B | ALLOWA-BLE | ALLOWA-BLE | VEHICLE TYPE 1 | OFFICE | CUSTOMER 1 | 14:30 | 14:40 | 10 |
| B | ALLOWA-BLE | ALLOWA-BLE | VEHICLE TYPE 1 | CUSTOMER 1 | OFFICE | 14:50 | 15:00 | - |
| C | ALLOWA-BLE | ALLOWA-BLE | VEHICLE TYPE 1 | OFFICE | CUSTOMER 2 | 15:45 | 15:55 | 10 |
| C | ALLOWA-BLE | ALLOWA-BLE | VEHICLE TYPE 1 | CUSTOMER 2 | OFFICE | 16:05 | 16:15 | - |
| . | . | . | . | . | . | . | . | . |

*FIG.7*

| SOC | | POWER CONSUMPTION RATE OF USER | |
|---|---|---|---|
| | | EXCELLENT | POOR |
| | A | DECREASE DR | DECREASE DR |
| | B | DECREASE DR | INCREASE DR (LOW PRIORITY) |
| | C | DECREASE DR | INCREASE DR |
| | D | INCREASE DR | INCREASE DR |

*FIG.11*

SYSTEM, METHOD, AND COMPUTER-READABLE STORAGE MEDIUM

The contents of the following Japanese patent application (s) are incorporated herein by reference:
NO. 2022-155614 filed in JP on Sep. 28, 2022.

BACKGROUND

1. Technical Field

The present invention relates to a system, a method, and a computer-readable storage medium.

2. Related Art

Patent Document 1 describes a technique in which a slave aggregator acquires time schedule information indicating that a capacitor mounted on transportation equipment can supply electrical power to a power grid (a power network), and transmits, to a master aggregator, a time schedule indicating an amount of electrical power which can be supplied as a whole to the power grid. Patent Document 2 describes a technique in which an energy cost required for traveling in the case of using each of a plurality of vehicles is estimated by using electricity cost information on the plurality of vehicles, and presentation is given to a user on the basis of the energy cost.

CITATION LIST

Patent Document 1: Japanese patent No. 6534403
Patent Document 2: Japanese Patent No. 7068852

BRIEF DESCRIPTION OF THE DRAWINGS

FIG. 5 illustrates power consumption rate information acquired for each combination of a user and a vehicle type.

FIG. 7 illustrates a list of a plurality of pieces of reservation information stored in the integrated management apparatus 50 and the vehicle management apparatus 60 in a table form.

FIG. 11 illustrates groups classified on the basis of a combination of the SOC of the battery 12 and the power consumption rate of the user of the vehicle 10.

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential to the solution of the invention.

Figure 1:
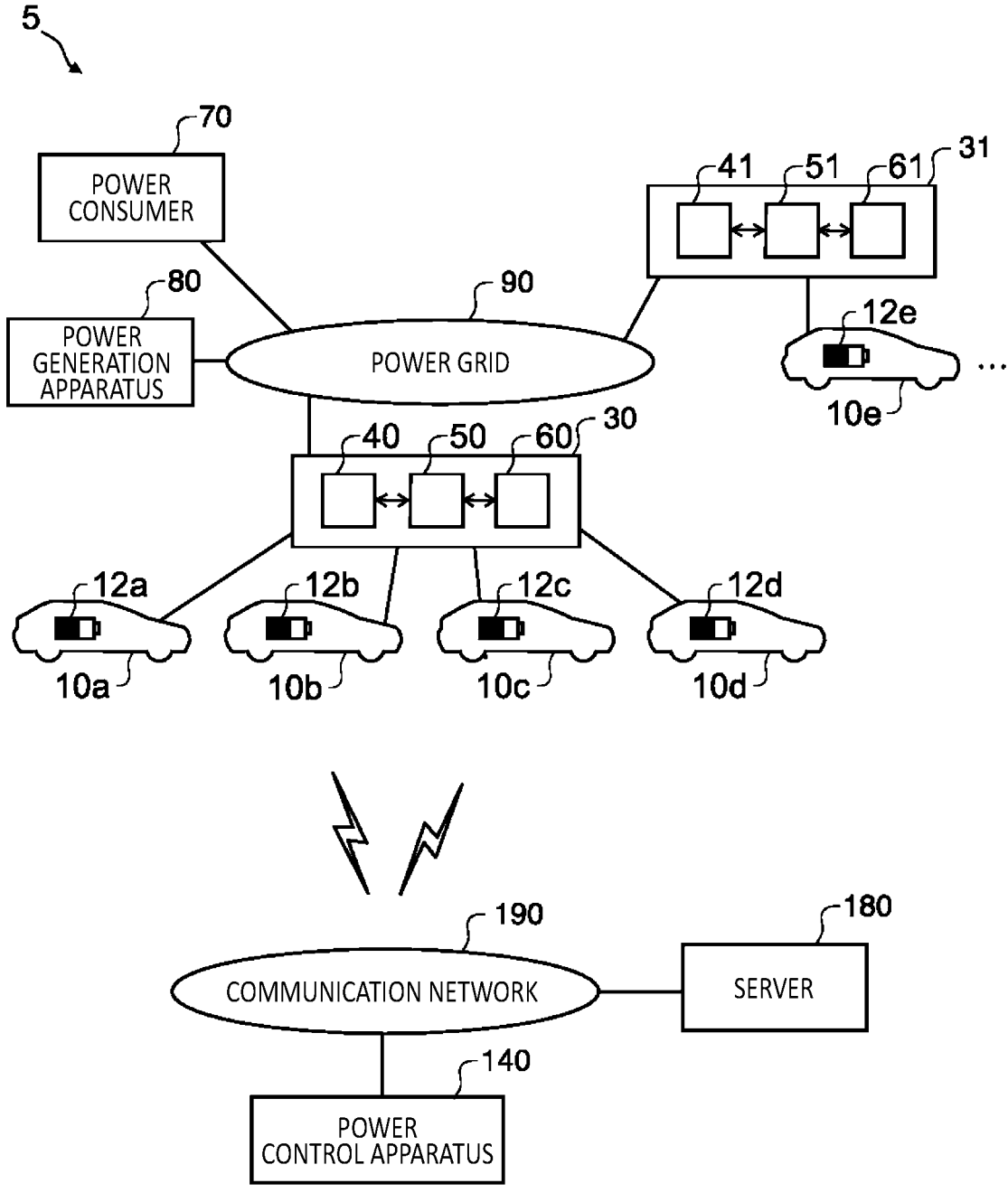
FIG. 1 conceptually illustrates a utilization form of a system 5 in an embodiment.

FIG. 1 conceptually illustrates a utilization form of a system 5 in an embodiment. The system 5 includes a power generation apparatus 80, a plurality of vehicles including a vehicle 10a, a vehicle 10b, a vehicle 10c, a vehicle 10d, and a vehicle 10e, a power control apparatus 40 and a power control apparatus 41, an integrated management apparatus 50 and an integrated management apparatus 51, a vehicle management apparatus 60 and a vehicle management apparatus 61, a power control apparatus 140, and a server 180.

A power consumer 70 and the power generation apparatus 80 are connected to a power grid 90. The electrical power generated by the power generation apparatus 80 can be supplied to the power consumer 70 through the power grid 90. The power grid 90 is a power system, for example.

The vehicle 10a, the vehicle 10b, the vehicle 10c, the vehicle 10d, and the vehicle 10e are electric vehicles including a battery 12a, a battery 12b, a battery 12c, a battery 12d, and a battery 12e which accumulate driving power for vehicle traveling, respectively. In the present embodiment, in particular, the vehicle 10a, the vehicle 10b, the vehicle 10c, and the vehicle 10d may be collectively referred to as a "vehicle(s) 10", and the battery 12a, the battery 12b, the battery 12c, and the battery 12d may be collectively referred to as a "battery 12".

The vehicle 10 is disposed in an office 30. The office 30 functions as a base for parking the vehicle 10. The vehicle 10 may be, for example, a vehicle for business use or a vehicle for carrying cargos such as products handled by the office 30. Electrical power is supplied to the office 30 through the power grid 90.

The power control apparatus 40, the integrated management apparatus 50, and the vehicle management apparatus 60 are provided in the office 30. The vehicle 10 is provided to be able to communicate with the vehicle management apparatus 60 through a mobile communication network or the like. The office 30 has a local power grid in the office, and can perform power transfer from/to the battery 12 included in the vehicle 10 through a charge/discharge apparatus provided in the office 30. That is, the vehicle 10 can be used for energy management in the office 30. The battery 12 included in the vehicle 10 can perform power transfer from/to the power grid 90 through the power grid in the office 30. The power control apparatus 40 controls charging and discharging of the vehicle 10 disposed in the office 30 so as to at least satisfy a power demand in the office 30.

The power control apparatus 40, the integrated management apparatus 50, and the vehicle management apparatus 60 are managed, for example, in the office 30. The power control apparatus 40 and the integrated management apparatus 50 are provided to be able to communicate with each other through a communication line. The integrated management apparatus 50 and the vehicle management apparatus 60 are provided to be able to communicate with each other through a communication line. The integrated management apparatus 50 and the vehicle management apparatus 60 may be provided outside the office 30. The integrated management apparatus 50 and the vehicle management apparatus 60 may be provided to be able to communicate with each other through a communication line such as the Internet. One or both of the integrated management apparatus 50 and the vehicle management apparatus 60 may be embodied as a server such as a cloud server.

The vehicle management apparatus 60 decides a moment at which the vehicle 10 departs from the office 30 and a moment at which the vehicle returns to the office. The integrated management apparatus 50 adjusts the moment at which the vehicle 10 departs from the office 30 and the moment at which the vehicle returns to the office, so as to satisfy the power demand in the office 30. For example, the integrated management apparatus 50 adjusts the moment at which the vehicle 10 departs from the office 30 and the moment at which the vehicle returns to the office, so that the peak cut of the power demand in the office 30 can be performed. The vehicle management apparatus 60 manages the vehicle 10 on the basis of the schedule of the vehicle 10 adjusted by the integrated management apparatus 50. The power control apparatus 40 controls charging and discharging of the battery 12 included in the vehicle 10 on the basis of the schedule of the vehicle 10 adjusted by the integrated management apparatus 50.

The vehicle 10e is disposed in an office 31. The office 31 functions as a base for parking the vehicle 10e. Similarly to the vehicle 10, the vehicle 10e may be a vehicle for business use or a vehicle for carrying cargos such as products handled by the office 30. Electrical power is supplied to the office 31 through the power grid 90. The power control apparatus 41, the integrated management apparatus 51, and the vehicle management apparatus 61 are provided in the office 31.

In the office 31, the power control apparatus 41, the integrated management apparatus 51, and the vehicle management apparatus 61 correspond to the power control apparatus 40, the integrated management apparatus 50, and the vehicle management apparatus 60. The power control apparatus 41, the integrated management apparatus 51, and the vehicle management apparatus 61 perform control similar to that of the power control apparatus 40, the integrated management apparatus 50, and the vehicle management apparatus 60 except that a control target and/or a management target are the office 31 and/or the vehicle 10e. For this reason, description of the control regarding the power control apparatus 41, the integrated management apparatus 51, the vehicle management apparatus 61, and the vehicle 10 is omitted.

The power control apparatus 140 communicates with the power control apparatus 40 and the power control apparatus 41 through a communication network 190, and supervises overall power control in the office 30 and the office 31. For example, the power control apparatus 140 collects information regarding power supply and demand from the power control apparatus 40 and the power control apparatus 41, and adjusts overall power supply and demand including electrical power trading with the power grid 90, so that the power control apparatus 40 and the power control apparatus 41 are caused to perform control so as to minimize the total power cost of the office 30 and the office 31.

The power control apparatus 140 is connected to the server 180 through the communication network 190. The server 180 is, for example, a server used by a power aggregator. The server 180 conducts electrical power trading in an electricity market. The power control apparatus 140 can integrate the office 30 and the vehicles disposed in the office 30 and provide the server 180 with power resources held in the integrated vehicles. The power control apparatus 140 causes the power control apparatuses 40 and 41 to control charging and discharging of the battery of each vehicle disposed in the office 30 and the office 31, and provides the electrical power contracted by the server 180. For example, according to the demand from the server 180, the power control apparatus 140 controls the power control apparatus 40 and charging and discharging of the battery 12 controlled by the power control apparatus 40, and provides electrical power corresponding to the demand.

The control mainly related to the office 30 will be described with reference to FIGS. 2 to 9 or the like. Specifically, the control regarding the power control apparatus 40, the integrated management apparatus 50, the vehicle management apparatus 60, and the vehicle 10 will be described. However, the control related to the office 30 can be applied to the control related to the office 31.

Figure 2:
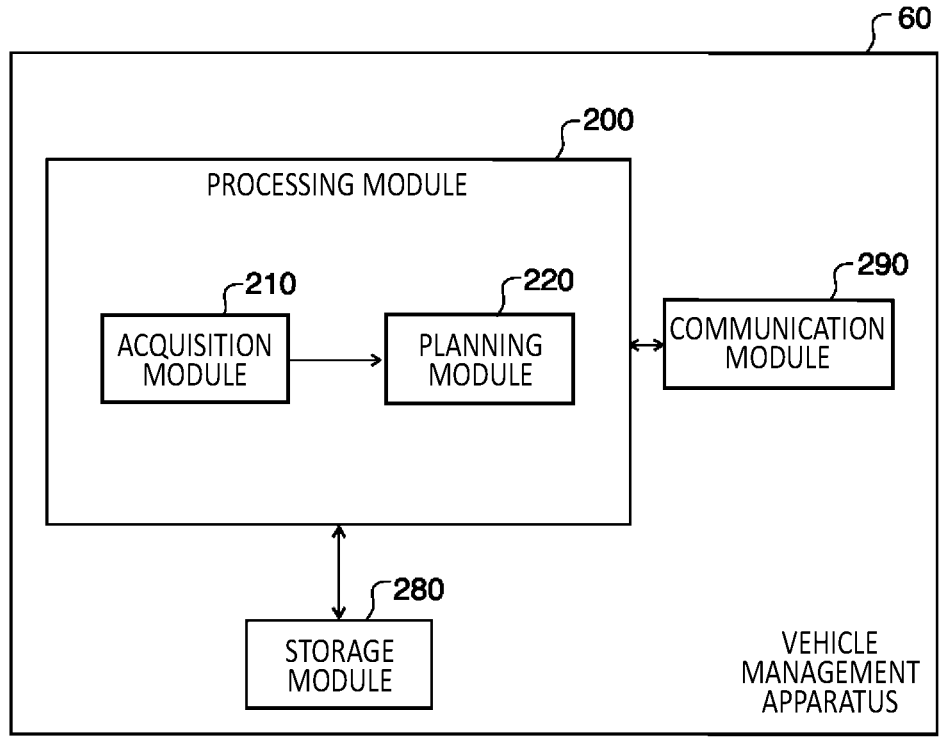
FIG. 2 illustrates an example of a system configuration of a vehicle management apparatus 60.

FIG. 2 illustrates an example of a system configuration of the vehicle management apparatus 60. The vehicle management apparatus 60 includes a processing module 200, a storage module 280, and a communication module 290.

The processing module 200 controls the communication module 290. The communication module 290 is responsible for communication between the vehicle 10 and the integrated management apparatus 50. The processing module 200 is embodied as an arithmetic processing apparatus including a processor. Each storage module 280 is embodied including a non-volatile storage medium. The processing module 200 performs processing by using information stored in the storage module 280. The processing module 200 may be embodied as a microcomputer including a CPU, a ROM, a RAM, an I/O, a bus, and the like. The vehicle management apparatus 60 may be embodied as a computer.

In the present embodiment, the vehicle management apparatus 60 shall be embodied as a single computer. However, in another embodiment, the vehicle management apparatus 60 may be embodied as a plurality of computers. At least some of the functions of the vehicle management apparatus 60 may be embodied as one or more servers such as a cloud server.

The processing module 200 includes an acquisition module 210 and a planning module 220.

The acquisition module 210 acquires reservation information for reserving the use of the vehicle 10 from among the plurality of vehicles 10. The reservation information includes, for example, a selection condition for selecting the vehicle 10 to be used by the user and information for designating the degree of importance of the selection condition. The selection condition includes, for example, at least one of a condition for selecting a use period of the vehicle 10 or a condition for selecting a vehicle type. The storage module 280 stores the reservation information acquired by acquisition module 210.

The acquisition module 210 acquires information indicating the driver of the vehicle 10, and the power consumption amount of the battery 12 and the travel distance of the vehicle 10 when the driver of the vehicle 10 are driving the vehicle 10. The acquisition module 210 acquires the power consumption rate on the basis of the power consumption amount and the travel distance. The storage module 280 stores the calculated power consumption rate information.

The planning module 220 makes the use plan of the vehicle 10 on the basis of the reservation information stored in the storage module 280. For example, on the basis of the selection condition stored in the storage module 280, the planning module 220 prepares a dispatch plan indicating which user is allowed to use the vehicle 10. Specifically, the planning module 220 prepares the dispatch plan by selecting the vehicle 10 to be used by the user on the basis of the selection condition.

The communication module 290 transmits the dispatch plan to the integrated management apparatus 50. The communication module 290 may further transmit at least a part of the reservation information to the integrated management apparatus 50. As described later, when the vehicle 10 to be used by the user is changed due to arbitration of a conflicting reservation, the communication module 290 may transmit, to the user that has reserved the changed vehicle 10, a notification indicating that the vehicle 10 is changed. The communication module 290 may transmit the power consumption rate information stored in the storage module 280 to the integrated management apparatus 50.

Figure 3:
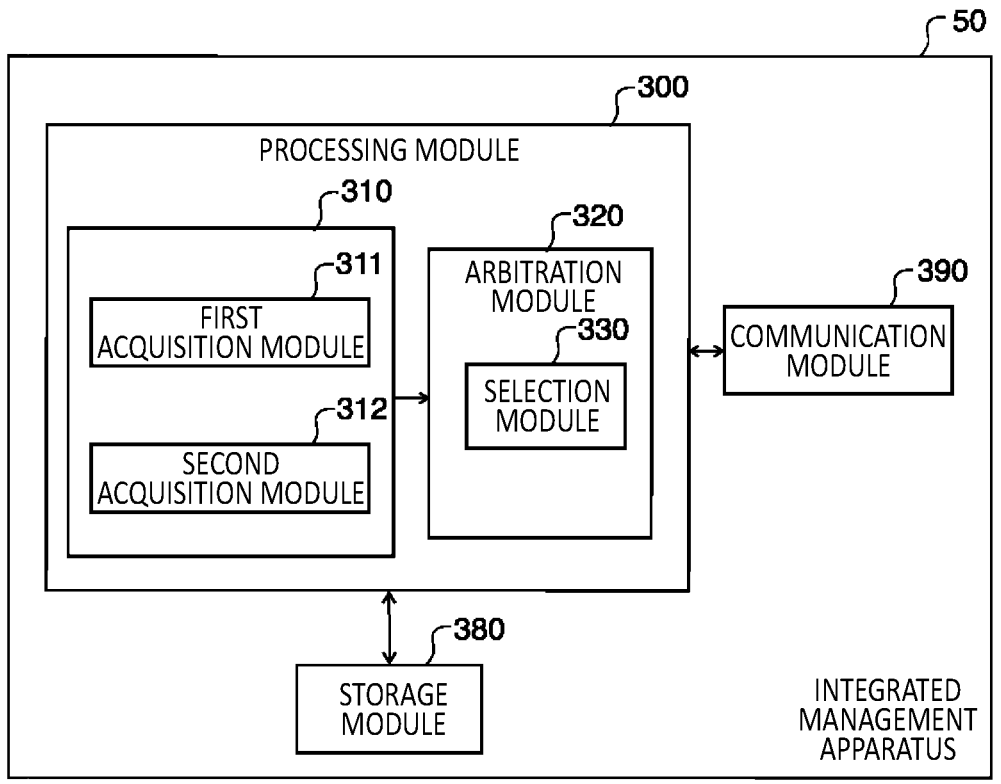
FIG. 3 illustrates an example of a system configuration of an integrated management apparatus 50.

FIG. 3 illustrates an example of a system configuration of the integrated management apparatus 50. The integrated management apparatus 50 includes a processing module 300, a storage module 380, and a communication module 390.

The processing module 300 controls the communication module 390. The communication module 390 is responsible for communication between the power control apparatus 140 and the integrated management apparatus 50. The processing module 300 is embodied as an arithmetic processing apparatus including a processor. Each storage module 380 is embodied including a non-volatile storage medium. The processing module 300 performs processing by using information stored in the storage module 380. The processing module 300 may be embodied as a microcomputer including a CPU, a ROM, a RAM, an I/O, a bus, and the like. The integrated management apparatus 50 may be embodied as a computer.

In the present embodiment, the integrated management apparatus 50 shall be embodied including a single computer. However, in another embodiment, the integrated management apparatus 50 may be embodied as a plurality of computers. At least some of the functions of the integrated management apparatus 50 may be embodied including one or more servers such as a cloud server.

The processing module 300 includes an acquisition module 310 and an arbitration module 320. The acquisition module 310 includes a first acquisition module 311 and a second acquisition module 312. The arbitration module 320 includes a selection module 330.

When the use schedule of the vehicle 10 according to the dispatch plan and the use schedule of the vehicle 10 according to the power plan received from the power control apparatus 40 conflict with each other, the arbitration module 320 arbitrates the conflicting use schedule.

The first acquisition module 311 acquires information indicating a driving-scheduled period of the plurality of vehicles 10 each including the battery 12 and a driving characteristic of the driver who drives each of the plurality of vehicles 10 in the driving-scheduled period. The first acquisition module 311 acquires the driving-scheduled period from the vehicle management apparatus 60. The reservation information acquired by the vehicle management apparatus 60 is an example of the information indicating the driving-scheduled period. The first acquisition module 311 may acquire, from the storage module 380, the information indicating the driving characteristic of the driver. The first acquisition module 311 may acquire, from the vehicle management apparatus 60, the information indicating the driving characteristic of the driver.

The second acquisition module 312 acquires information indicating a power transfer-scheduled period during which power transfer is to be performed between the battery 12 included in at least one vehicle 10 of the plurality of vehicles 10 and the power grid. The second acquisition module 312 may acquire, from the power control apparatus 40, the information indicating the power transfer-scheduled period. The power grid is, for example, a power grid in the office 30 and/or a power grid 90. The selection module 330 specifies, on the basis of the driving-scheduled period, the driving characteristic, and the power transfer-scheduled period, the driving characteristic of the driver of the vehicle 10 to be driven within a predetermined period from the power transfer-scheduled period, and selects, on the basis of the driving characteristic being specified, the vehicle 10 of which the battery 12 is used for power transfer from/to the power grid.

The driving characteristic may include the power consumption rate of the battery 12 acquired when the driver drives the vehicle 10. The driving characteristic may include the power consumption rate acquired for each combination of the driver and the vehicle type. The driving characteristic may include the power consumption rate acquired for each combination of the driver and the day of the week. The driving characteristic may include the power consumption rate acquired for each combination of the driver and the travel route of the vehicle 10. The driving characteristic may include the power consumption rate acquired for each combination of the driver and the plurality of vehicles 10.

The selection module 330 selects the vehicle 10 of which the battery 12 is used for power transfer on the basis of the power consumption rate and whether to perform power supply from the battery 12 to the power grid or to perform power supply from the power grid to the battery 12 in the power transfer-scheduled period. Specifically, the selection module 330 may select, as the vehicle 10 which performs power supply from the battery 12 included in the vehicle 10 to the power grid, the vehicle 10 to be driven by the driver having a power consumption rate lower than a predetermined value, and select, as a period for performing power supply from the battery 12 included in the vehicle 10 to the power grid, a period after the driver having a power consumption rate lower than the predetermined value ends driving the vehicle 10. The selection module 330 may select, as the vehicle 10 which performs power supply from the power grid to the battery 12 included in the vehicle 10, the vehicle 10 to be driven by the driver having a power consumption rate higher than the predetermined value, and select, as a period for performing power supply from the power grid to the battery 12 included in the vehicle 10, a period after the driver having a power consumption rate higher than the predetermined value ends driving the vehicle 10.

Figure 4:
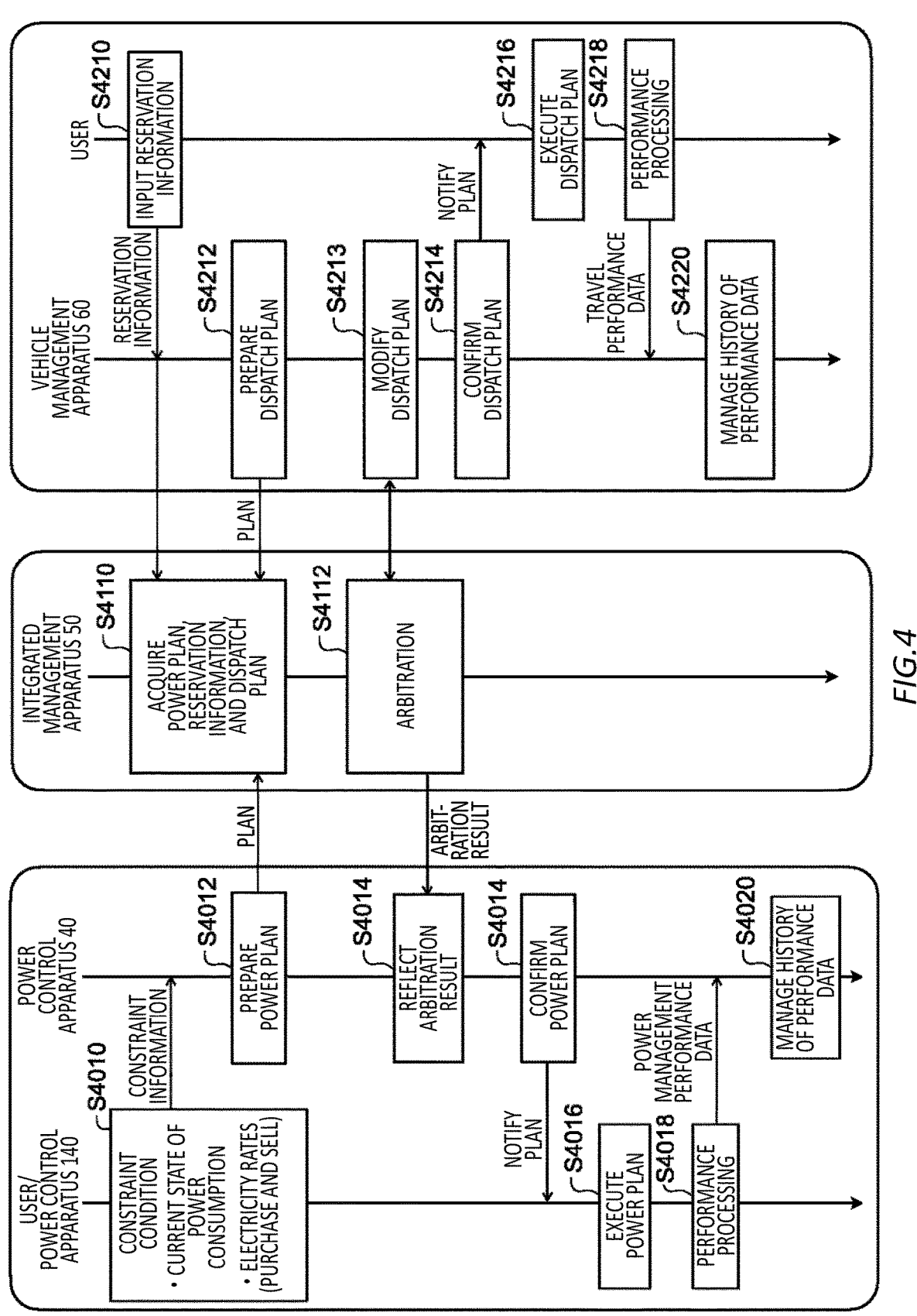
FIG. 4 illustrates an execution sequence of a power control apparatus 40, the integrated management apparatus 50, and the vehicle management apparatus 60.

FIG. 4 illustrates an execution sequence of the power control apparatus 40, the integrated management apparatus 50, and the vehicle management apparatus 60. The processing of FIG. 4 shows processing while a power plan and a dispatch plan for the next day are prepared on the previous day and various kinds of control are executed according to the prepared plan.

As the control regarding the power control apparatus 40, in S4010, at least one of the user of the power control apparatus 40 or the power control apparatus 140 sets a constraint condition regarding the power plan in the office 30 and notifies the power control apparatus 40 of the constraint condition. The power control apparatus 140 may set the constraint condition in the office 30 so as to minimize the overall power cost in the office 31 and the office 30. Note that the user is a person or a system that inputs, to the power control apparatus 40, information regarding power management in the office 30. The constraint condition is a condition which is a constraint on preparing the power plan. The constraint condition may include a constraint required to satisfy the power demand. The constraint condition includes, for example, information regarding the current status of a power generation amount, the current status of a power consumption amount, and an electricity rate. The power generation amount is, for example, a power generation amount in the power generation apparatus 80. The power consumption amount is a power consumption amount in the office 30. The electricity rate includes a power purchase price and a power selling price. The power purchase price is, for example, a condition regarding an amount of money imposed as a consideration for power reception by the office 30 from the power grid 90. The power selling price is, for example, a condition regarding an amount of money obtained as a compensation for power supply by the office 30 to the power grid 90.

In S4012, the power control apparatus 40 prepares a power plan in the office 30 for the next day. The power plan includes a power consumption amount for each time zone in one day. The power plan determines how much electrical power is consumed for each time zone in the office 30. The power consumption amount for each time zone on the next day may be predicted from environmental information such as weather information on the next day and past performance data. The power plan may include peak shaving information for performing peak shaving. The peak shaving information may include information indicating how much amount of power consumption is to be suppressed in the office 30 in which time zone. The peak shaving information may include information indicating how much amount of electrical power is to be received in the office 30 from the outside in which time zone.

The power control apparatus 40 may prepare an optimal power plan in the office 30. For example, the power control apparatus 40 may prepare a power plan so as to minimize the amount of electrical power received from the power grid 90 in the office 30. The power control apparatus 40 may prepare a power plan so as to minimize the amount of money imposed as a consideration for power reception in the office 30 from the power grid 90. The power control apparatus 40 may prepare a power plan so as to maximize the amount of money obtained as a compensation for power supply in the office 30 to the power grid 90. In this manner, the power control apparatus 40 prepares an optimal power plan as the power plan in the office 30 for the next day on the basis of the constraint condition. With this power plan, the amount of electrical power which needs to be received from the outside in each time zone of the next day is determined. The amount of electrical power which needs to be received from the outside may be supplied from the battery 12 included in the vehicle 10 parking in the office 30. The power control apparatus 40 transmits the prepared power plan to the integrated management apparatus 50.

As the control regarding the vehicle management apparatus 60, in S4210, the user inputs reservation information regarding the dispatch of the vehicle 10. The contents of the reservation information will be specifically described with reference to FIG. 7. The user of the vehicle management apparatus 60 is a person, a system, or the like that uses the vehicle 10. The reservation information includes a condition that can be a constraint on preparing the dispatch plan. The reservation information includes, for example, a departure place and a destination, a departure moment and an arrival moment to the destination, and a type, a capacity, a weight, and the like of a load on the vehicle 10. Depending on the departure place and the destination, it is determined from which place to which place the vehicle 10 needs to travel. The departure moment may be, for example, the moment at which the vehicle 10 departs from the office 30, and the arrival moment may be, for example, the moment at which the vehicle 10 returns to the office 30. For the departure moment and the arrival moment, a time adjustment allowance indicating allowable time for changes in the departure moment and the arrival moment of the vehicle 10 may be set. The reservation information input in S4210 is transmitted to the vehicle management apparatus 60 and transmitted to the integrated management apparatus 50 through the vehicle management apparatus 60.

In S4212, the planning module 220 of the vehicle management apparatus 60 prepares a dispatch plan in the office 30 for the next day on the basis of the constraint condition notified from the user. For example, the planning module 220 decides the vehicle 10 to be used for transportation of persons or loads, the travel route of the vehicle 10, and the travel speed of the vehicle 10, so as to satisfy the transportation demand decided by the reservation information. The vehicle management apparatus 60 transmits the prepared dispatch plan to the integrated management apparatus 50. At this time, the vehicle management apparatus 60 may transmit, to the integrated management apparatus 50, the SOC and the storage capacity of the battery 12 of the vehicle 10 and the power consumption rate information of each user together with the dispatch plan.

In S4110, the acquisition module 310 of the integrated management apparatus 50 acquires the power plan transmitted from the power control apparatus 40, and the reservation information and the dispatch plan transmitted from the vehicle management apparatus 60.

In S4112, the arbitration module 320 of the integrated management apparatus 50 determines whether the power plan in the office 30 is satisfied when the vehicle 10 is operated according to the dispatch plan. For example, a period during which the vehicle 10 is predicted to be present at the office 30 is determined from the dispatch plan. In a period during which the office 30 needs to be supplied with electrical power from the outside, when it is predicted that electrical power can be received from the battery 12 included in the vehicle 10 present in the office 30 during the period, the arbitration module 320 determines that the power plan is satisfied.

When it is determined that the power plan cannot be satisfied when the vehicle is dispatched according to the dispatch plan, the arbitration module 320 determines how to modify the dispatch plan to satisfy the power plan. For example, the arbitration module 320 decides adjustment amounts of the departure moment and the arrival moment of the vehicle 10 in the dispatch plan.

The integrated management apparatus 50 transmits, to the vehicle management apparatus 60, modification information including the decided adjustment amounts of the departure moment and the return moment. When receiving the modification information from the integrated management apparatus 50, the planning module 220 of the vehicle management apparatus 60 modifies the dispatch plan prepared in S4212 on the basis of the modification information (S4213). For example, the planning module 220 modifies the dispatch plan so as to satisfy the reservation information on the basis of the adjustment amounts of the departure moment and the return moment received from the integrated management apparatus 50. The vehicle management apparatus 60 transmits the modification result of the dispatch plan to the integrated management apparatus 50. The integrated management apparatus 50 and the vehicle management apparatus 60 repeat the processing of S4112 and S4213 to decide an executable dispatch plan. In S4213, the planning module 220 decides an operating route of the vehicle 10, and decides an executable dispatch plan by determining whether the departure moment and the arrival moment designated by the reservation information can be observed and determining, on the basis of the SOC and the power consumption rate of the vehicle 10, whether the vehicle 10 can return to the office 30 without occurrence of an electricity shortage. In addition, in S4112, in consideration of the power cost reduction amount of the office 30 obtained when electrical power is transferred between the battery 12 and the office 30 according to the decided power plan, and the operation cost of the vehicle 10 and the utilization rate of the vehicle 10 required when the operation of the vehicle 10 is performed according to the dispatch plan, the arbitration module 320 may determine that the dispatch plan is executable on condition that it is determined that a profit can be obtained overall.

Note that in S4112, the arbitration module 320 may calculate the power consumption amount of the battery 12 at the time of traveling of the vehicle 10 on the basis of the travel distance guided from the travel route decided by the planning module 220 and the power consumption rate associated with the user who drives the vehicle 10. The arbitration module 320 may check that no electricity shortage occurs in the vehicle 10 on the basis of the calculated power consumption amount and the storage capacity of the battery 12.

When the dispatch plan is decided, an arbitration result including the dispatch plan is transmitted to the power control apparatus 40. When receiving the arbitration result from the integrated management apparatus 50, the power control apparatus 40 reflects the arbitration result in the power plan on the basis of the arbitration result (S4014), and notifies the user of the power plan confirmed by reflecting the arbitration result (S4015). In S4016, the user and the power control apparatus 140 execute control according to the notified power plan. In S4018, the user and the power control apparatus 140 perform performance processing regarding execution of the power plan. For example, the user performs processing of collecting and inputting the performance data of power management including the performance data of the power consumption amount in each time zone. In S4020, the power control apparatus 40 manages, as history information, the performance data input from each of the user and the power control apparatus 140. Note that the power control apparatus 40 may use the history information managed by the power control apparatus 40 when preparing the power plan later.

The vehicle management apparatus 60 confirms the dispatch plan finally decided in S4213 (S4214), and notifies the user of the confirmed dispatch plan through the communication module 290. In S4216, the user executes operation control of the vehicle 10 according to the notified dispatch plan. In S4218, the user performs performance processing regarding the execution of the dispatch plan. For example, the user includes processing of collecting and inputting travel performance data including travel data of each vehicle 10, the remaining capacity of the battery 12, and the like. In S4220, the vehicle management apparatus 60 manages, as history information, the travel performance data input from the user. Note that the vehicle management apparatus 60 may use the history information managed by the vehicle management apparatus 60 when preparing the dispatch plan later.

FIG. 5 illustrates power consumption rate information acquired for each combination of the user and the vehicle type. The power consumption rate information includes "user" and "power consumption rate". The power consumption rate information may be acquired from the vehicle management apparatus 60 and may be stored in the storage module 380.

The "user" is identification information of a person that uses the vehicle 10. In the "power consumption rate", data items of "vehicle type 1", "vehicle type 2", and "vehicle type 3" are set. The "vehicle type 1" stores an average value of power consumption rates of the vehicle 10 measured when the user drives the vehicle 10 of the vehicle type indicated by the "vehicle type 1". The "vehicle type 2" stores an average value of power consumption rates of the vehicle 10 measured when the user drives the vehicle 10 of the vehicle type indicated by the "vehicle type 2". The "vehicle type 3" stores an average value of power consumption rates of the vehicle 10 measured when the user drives the vehicle 10 of the vehicle type indicated by the "vehicle type 3". The power consumption rate indicates, for example, the amount of electrical power of the battery 12 consumed when the vehicle 10 travels 1 km. The power consumption rate is information indicating so-called electricity cost. As illustrated in FIG. 5, in the present embodiment, it is assumed that the power consumption rate when a user C drives the vehicle 10 is relatively high.

The data set of the power consumption rate as illustrated in FIG. 5 may be generated for each specific condition such as a weekday, a holiday, a day of the week, a season, weather, or a travel route, or for each combination of a plurality of conditions. When various types of processing are performed by using the data set of the power consumption rate, the selection module 330 may use a data set generated under a condition suitable for a use scene of the data set.

Figure 6:
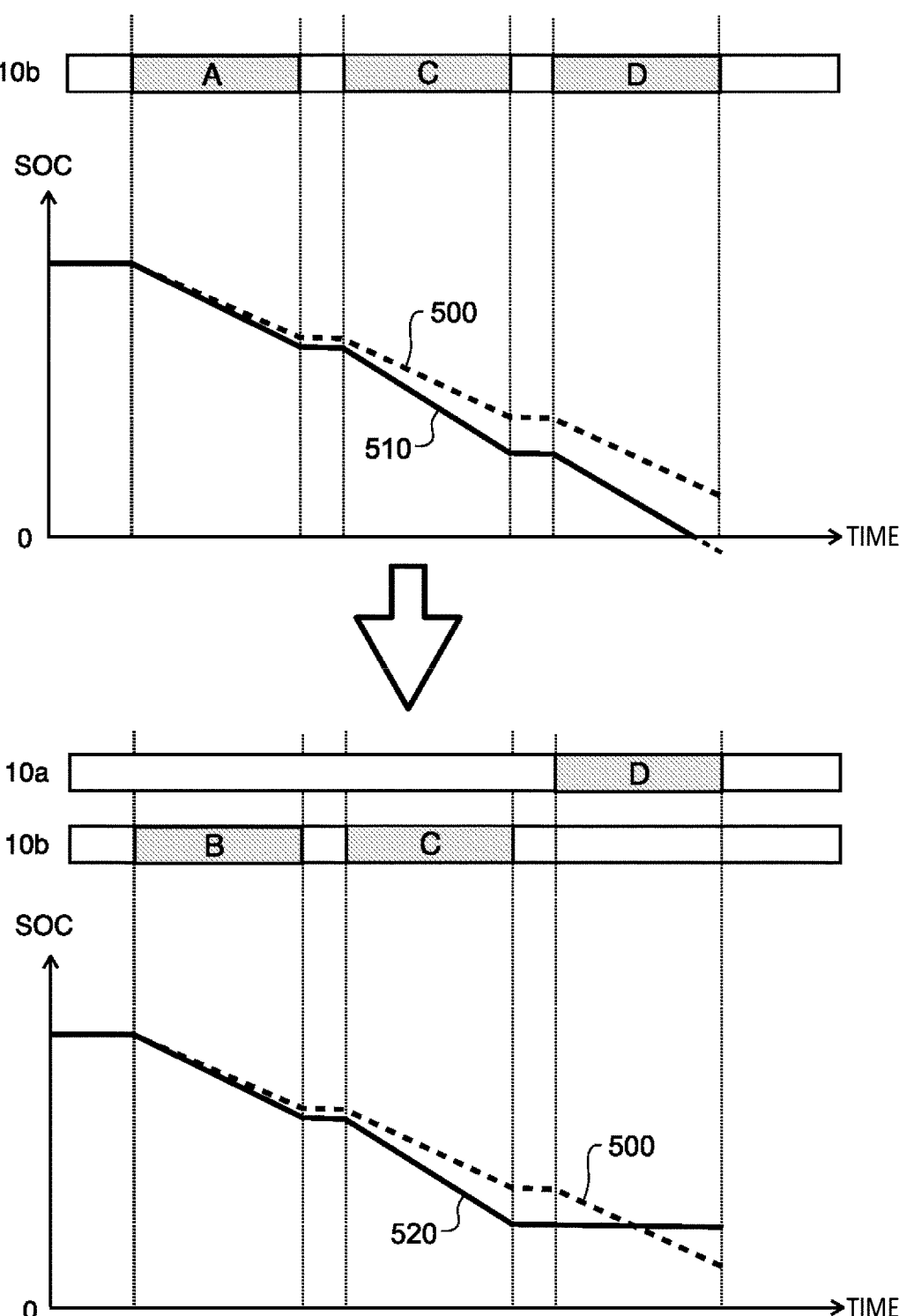
FIG. 6 is a diagram for explaining processing of modifying a dispatch plan in consideration of a power consumption rate of each user.

FIG. 6 is a diagram for explaining processing of modifying the dispatch plan in consideration of the power consumption rate of each user. As illustrated in FIG. 6, it is assumed that a plan in which the user A, the user C, and the user D sequentially drive the vehicle 10b is prepared as the vehicle dispatch plan.

In FIG. 6, reference numeral 500 represents a change in the SOC of the battery 12b calculated by using the average power consumption rate of the vehicle 10b. As indicated by reference numeral 500, when the calculation is performed by using the average power consumption rate of the vehicle 10b, it is predicted that the driving of the user D is completed before the SOC of the vehicle 10d becomes 0.

However, when the SOC is evaluated with reference to the power consumption rate information illustrated in FIG. 5 by using the power consumption rates associated with the user A, the user C, and the user D, the SOC reaches 0 before the driving of the user D is completed as indicated by reference numeral 510. Therefore, when the user A, the user C, and the user B actually drive the vehicle 10b, it can be said that an electricity shortage may occur.

In this regard, the arbitration module 320 proposes to modify the dispatch plan so as not to select the vehicle 10b as the vehicle to be used by the user D but to select the vehicle 10a. As a result, as indicated by reference numeral 520, the SOC of the battery 12b can be prevented from reaching 0.

FIG. 7 illustrates a list of a plurality of pieces of reservation information stored in the integrated management apparatus 50 and the vehicle management apparatus 60 in a table form. Each piece of reservation information includes information indicating "user", "time change", "vehicle type change", "vehicle type designation", "departure place", "destination", "departure moment", "arrival moment", and "stay time". Among the information included in the reservation information, the "vehicle type designation", the "departure place", the "destination", the "departure moment", the "arrival moment", and the "stay time" are examples of the selection condition of the vehicle 10 to be used by the user. The "time change" and the "vehicle change" are examples of information for designating the degree of importance of the selection condition.

The "user" is identification information of a person that uses the vehicle 10.

The "time change" is information indicating whether the selection condition regarding the use period is allowed to be changed. The selection condition regarding the use period is the "departure moment", the "arrival moment", and the "stay time" to be described later. "Unallowable" of the "time change" indicates that the selection condition regarding the use period is not allowed to be changed. "Allowable" of the "time change" indicates that the selection condition regarding the use period is allowed to be changed. The "time change" is an example of information for designating the degree of importance of the selection condition regarding the use period.

The "vehicle type change" is information indicating whether the selection condition regarding the type (vehicle type) of the vehicle to be used is allowed to be changed. The selection condition regarding the vehicle type is the "vehicle type designation" to be described later. "Unallowable" of "vehicle type change" indicates that the selection condition regarding the vehicle type is not allowed to be changed. "Allowable" of the "vehicle type change" indicates that the selection condition regarding the vehicle type is allowed to be changed. The "vehicle type change" is an example of information for designating the degree of importance of the selection condition regarding the vehicle type.

The "vehicle type designation" is designated when it is desired to use a vehicle of a specific vehicle type. The "vehicle type designation" is identification information of the vehicle type.

The "departure place" indicates the departure place of the vehicle 10. The "destination" indicates the destination of the vehicle 10.

The "departure moment" is a moment at which the vehicle 10 is scheduled to depart from the departure place. The "arrival moment" is a moment at which the vehicle 10 is scheduled to arrive at the destination. The "stay time" indicates a length of time in which the vehicle 10 stays at the destination. As an example, in the "stay time" in FIG. 7, the length of time for staying at the destination is indicated in minutes. The reservation information when the destination is the office 30 does not include the "stay time".

In the example of FIG. 7, according to the reservation information of the user A, it is reserved to use the vehicle 10 to depart from the office at 12:45, arrive at the place of a branch 1 at 12:55, then stay at the place of the branch 1 for 10 minutes, depart from the place of the branch 1 at 13:05, and arrive at the office 30 at 13:15. In this reservation, it is designated that the time change and the vehicle type change are allowed.

In the example of FIG. 7, according to the reservation information of the user B, it is reserved to use the vehicle 10 to depart from the office at 14:30, arrive at the place of a customer 1 at 14:40, then stay at the place of the customer 1 for 10 minutes, depart from the place of the customer 1 at 14:50, and arrive at the office 30 at 15:00. In this reservation, it is designated that the time change and the vehicle type change are allowed.

In the example of FIG. 7, according to the reservation information of the user C, it is reserved to use the vehicle 10*d* to depart from the office at 15:45, arrive at the place of a customer 2 at 15:55, then stay at the place of the customer 2 for 10 minutes, depart from the place of the customer 2 at 16:05, and arrive at the office 30 at 16:15. In this reservation, it is designated that the time change and the vehicle type change are allowed.

When a conflict occurs in the reservation, the arbitration module 320 arbitrates the conflicting reservation on the basis of the reservation information. For example, the arbitration module 320 adjusts the conflicting reservation by adjusting the departure moment and the arrival moment. In addition, the selection module 330 of the arbitration module 320 adjusts the conflicting reservation by selecting another vehicle 10 to be used by the user. The reservation information may further include, as the selection condition, information indicating a time adjustment allowance indicating allowable time for changes in the departure moment and/or the arrival moment. The arbitration module 320 may adjust the conflicting reservation by adjusting the departure moment and/or the arrival moment within the range of the time adjustment allowance.

Figure 8:
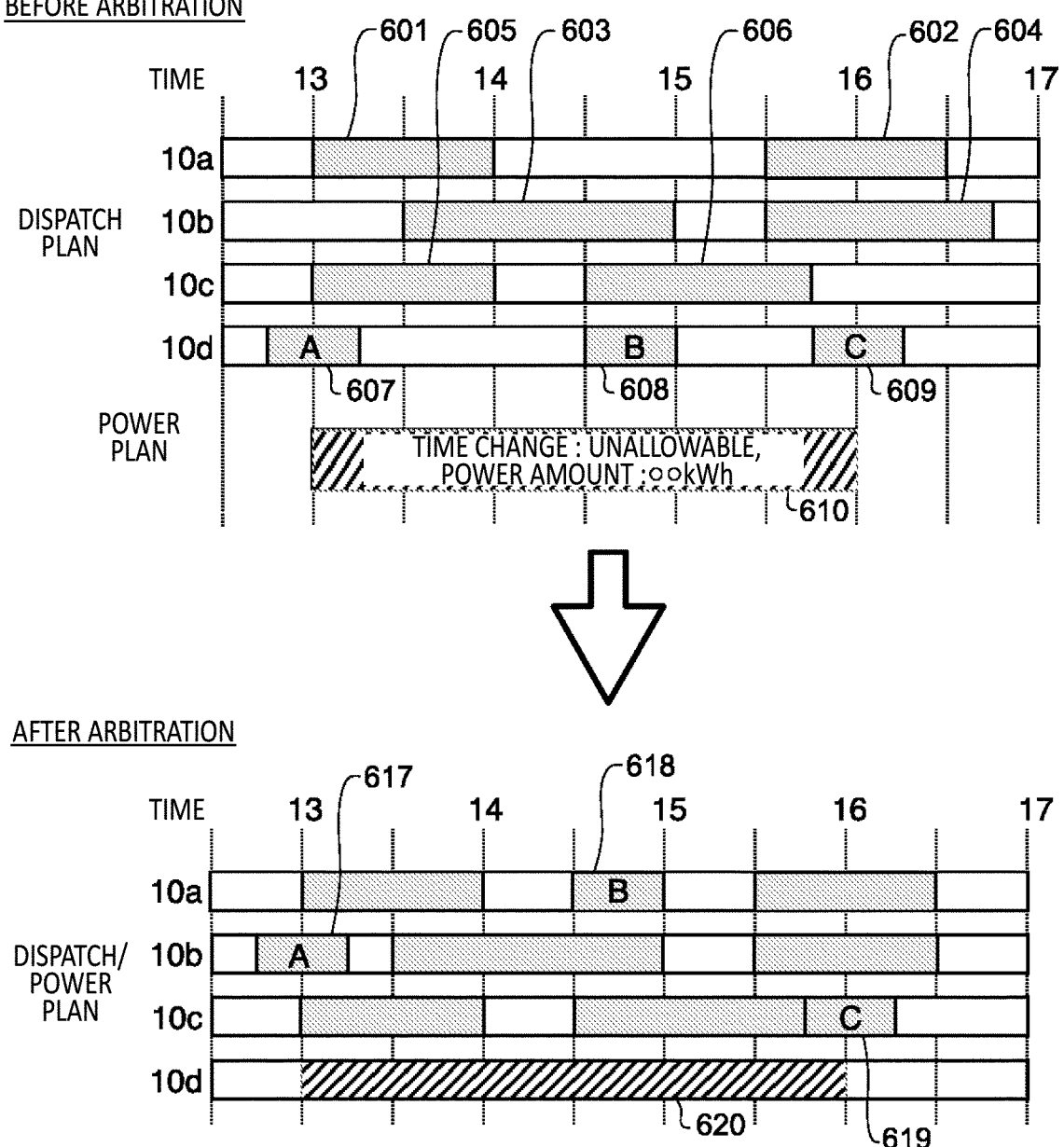
FIG. 8 illustrates a dispatch plan and a power plan before performing arbitration and a dispatch/power plan after performing the arbitration.

FIG. 8 illustrates the dispatch plan and the power plan before performing arbitration and the dispatch/power plan after performing the arbitration.

As illustrated in FIG. 8, in the pre-arbitration dispatch plan prepared by the vehicle management apparatus 60, as indicated by reference numerals 601 and 602, the vehicle 10*a* is planned to be used during the period of 13:00 to 14:00 and the period of 15:30 to 16:30. Further, as indicated by reference numerals 603 and 604, the vehicle 10*b* is planned to be used during the period of 13:30 to 15:00 and the period of 15:30 to 16:45. Further, as indicated by reference numerals 605 and 606, the vehicle 10*c* is planned to be used during the period of 13:00 to 14:00 and the period of 14:30 to 15:45. Further, as indicated by reference numerals 607, 608 and 609, the vehicle 10*d* is planned to be used during the period of 12:45 to 13:15, the period of 14:30 to 15:00, and the period of 15:45 to 16:15.

As indicated by reference numeral 610 in FIG. 8, in the power plan prepared by the power control apparatus 40, the vehicle is planned to be used to supply electrical power from the battery 12 to the office 30 for peak cut of the office 30 during the period of 13:00 to 16:00. For any vehicle 10 of the vehicles 10*a*, 10*b*, 10*c*, and 10*d*, the reservation based on the power plan and the reservation based on the dispatch plan conflict with each other. In this regard, the arbitration module 320 arbitrates the reservation based on the power plan and the reservation based on the dispatch plan as follows.

Here, in the power plan, selection conditions other than the use period for selecting the vehicle 10 to be used are assumed to be set such that the amount of electrical power to be supplied from the battery 12 is designated, and the time for using the vehicle 10 is not allowed to be changed (time change: unallowable). In this case, the arbitration module 320 selects the vehicle 10*d* as the vehicle 10 which can supply the designated amount of electrical power from the battery 12 in the designated period and has the shortest period during which the use period of the vehicle 10 according to the dispatch plan and the use period of the vehicle 10 according to the power plan overlap with each other.

As illustrated in FIG. 7, the vehicle type change is allowed in the reservation of the user A, the user B, and the user C for the vehicle 10*d*. Since the vehicle 10*b* has no reservation during the period of 12:45 to 13:15, the arbitration module 320 determines that the vehicle to be used by the user A during the period of 12:45 to 13:15 can be changed to the vehicle 10*b*. Similarly, since the vehicle 10*a* has no reservation during the period of 14:30 to 15:00, the arbitration module 320 determines that the vehicle to be used by the user B during the period of 14:30 to 15:00 can be changed to the vehicle 10*a*. Similarly, since the vehicle 10*c* has no reservation during the period of 15:45 to 16:15, the arbitration module 320 determines that the vehicle to be used by the user C during the period of 15:45 to 16:15 can be changed to the vehicle 10*c*.

At this time, the arbitration module 320 verifies, by using the power consumption rate associated with each user, that the SOC of the battery 12*b* does not fall below a predetermined value until the use of the vehicle 10*b* indicated by reference numeral 604 is completed even if the user A uses the vehicle 10*b* during the period of 12:45 to 13:15. Similarly, the arbitration module 320 verifies, by using the power consumption rate associated with each user, that the SOC of the battery 12*a* does not fall below the predetermined value until the use of the vehicle 10*a* indicated by reference numeral 602 is completed even if the user B uses the vehicle 10*a* during the period of 14:30 to 15:00. Similarly, the arbitration module 320 verifies, by using the power consumption rate associated with each user, that the SOC of the battery 12*c* does not fall below the predetermined value until the use of the vehicle 10*c* indicated by reference numeral 619 is completed even if the user C uses the vehicle 10*c* during the period of 15:45 to 16:15.

As described above, the arbitration module 320 changes, for the reservation of the user A for the vehicle 10*d*, the vehicle to be used to the vehicle 10*b* as indicated by reference numeral 617, changes, for the reservation of the user B for the vehicle 10*d*, the vehicle to be used to the vehicle 10*a* as indicated by reference numeral 618, and changes, for the reservation of the user C for the vehicle 10*d*, the vehicle to be used to the vehicle 10*c* as indicated by reference numeral 619. Then, as indicated by reference numeral 620, the selection module 330 selects the vehicle 10*d* as the vehicle which supplies electrical power to the office 30 on the basis of the power plan during the period of 13:00 to 16:00. Then, through the communication module 290 of the vehicle management apparatus 60, the user A, the user B, and the user C are notified that the vehicles to be used have been changed to the vehicle 10*b*, the vehicle 10*a*, and the vehicle 10*c*, respectively. As a result, the battery 12 of the vehicle 10 can be effectively used for the peak cut of the office 30 within a range that can be allowed by the user A, the user B, and the user C.

Figure 9:
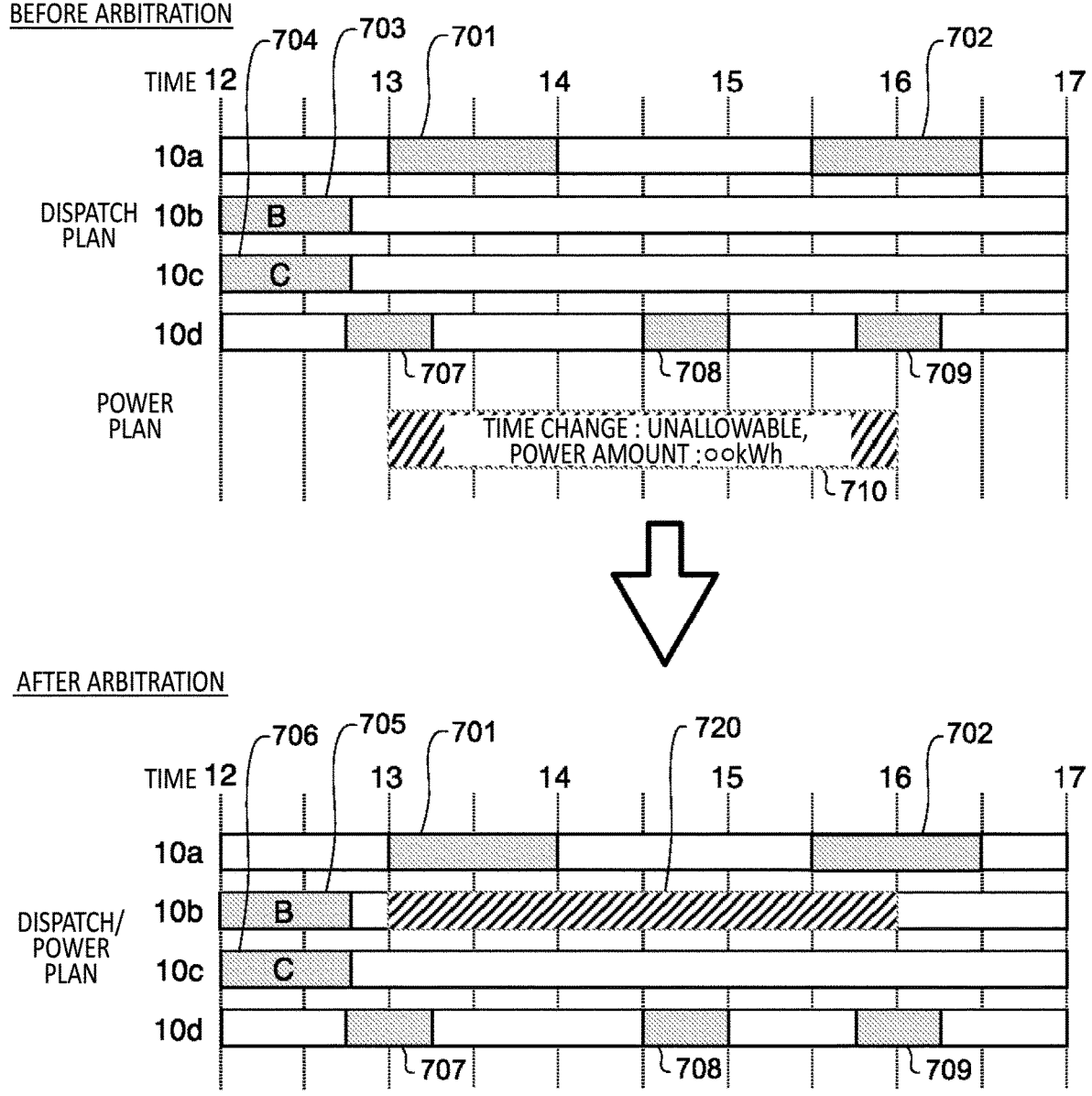
FIG. 9 is a diagram for explaining another processing regarding the arbitration of the dispatch plan and the power plan.

FIG. 9 is a diagram for explaining another processing regarding the arbitration of the dispatch plan and the power plan. As illustrated in FIG. 9, in the pre-arbitration dispatch plan prepared by the vehicle management apparatus 60, as indicated by reference numerals 701 and 702, the vehicle 10*a* is planned to be used during the period of 13:00 to 14:00 and the period of 15:30 to 16:30. Further, as indicated by reference numeral 703, the vehicle 10*b* is planned to be used during the period of 12:00 to 12:45. Further, as indicated by reference numeral 704, the vehicle 10*c* is planned to be used during the period of 12:00 to 14:00. Further, as indicated by reference numerals 707, 708 and 709, the vehicle 10*d* is planned to be used during the period of 12:45 to 13:15, the period of 14:30 to 15:00 and the period of 15:45 to 16:15.

Similarly to the case of FIG. 8, as indicated by reference numeral 710 in FIG. 9, in the power plan prepared by the power control apparatus 40, the vehicle is planned to be used to supply electrical power from the battery 12 to the office 30 for peak cut of the office 30 during the period of 13:00 to 16:00. Unlike the case of FIG. 8, in the case of FIG. 9, the vehicle 10*b* or the vehicle 10*c* is not scheduled to be used during the peak cut period of 13:00 to 16:00. In this regard, the selection module 330 selects one of the battery 12*b* of the vehicle 10*b* and the battery 12*c* of the vehicle 10*c* as a battery for performing the peak cut of the office 30 based on the power plan.

At this time, on the basis of the reservation information, the selection module 330 determines that the user of the vehicle 10*b* immediately before the peak cut period is the user B and the user of the vehicle 10*c* immediately before the peak cut period is the user C. In this regard, the selection module 330 refers to the power consumption rate information to compare the power consumption rate associated with the user C with the power consumption rate associated with the user B. The power consumption rate associated with the user B is lower than the power consumption rate associated with the user C. Therefore, it is expected that compared to the battery 12*c* of the vehicle 10*c*, the SOC of the battery 12*b* of the vehicle 10*b* does not decrease as much as scheduled. In this regard, the selection module 330 selects the battery 12*b* of the vehicle 10*b* as the battery which supplies electrical power to the office 30 for the peak cut of the office 30. As a result, as indicated by reference numeral 720 in FIG. 9, the vehicle 10*b* is selected as the vehicle which supplies electrical power to the office 30 on the basis of the power plan during the period of 13:00 to 16:00. Therefore, it is possible to reduce a possibility that the peak cut of the office 30 cannot be performed due to the insufficient charge of the battery 12*b*.

In the example of FIG. 9, a case where power supply is performed from the battery 12 to the office 30 in order to perform the peak cut of the office 30 has been described. On the other hand, in a case where power supply is performed from the office 30 to the battery 12, the selection module 330 may select the battery 12*c* of the vehicle 10*c* to be used by the user C as the battery to which power supply is performed from the office 30. Since the user C drives the vehicle 10*c*, there is a possibility that the SOC of the battery 12*c* is lower than scheduled. However, when the battery 12 is used to absorb surplus electrical power in the office 30 or the power grid 90, it may be rather desirable that the SOC of the battery 12*c* is lower than scheduled.

An example of a method of selecting the vehicle 10 to be used for power transfer from/to the office 30 will be described with reference to FIGS. 10 and 11.

Figure 10:
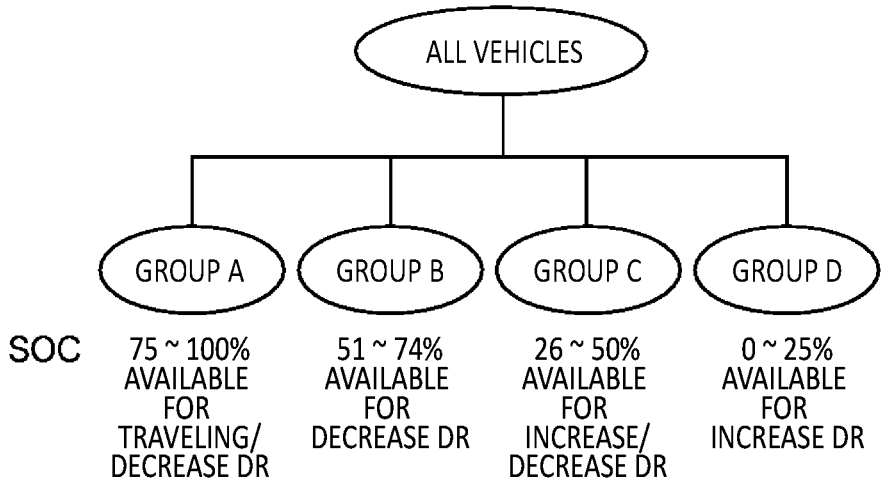
FIG. 10 schematically illustrates grouping of vehicles 10 based on an SOC.

FIG. 10 schematically illustrates grouping of the vehicles 10 based on the SOC. Each of the vehicles 10 is classified into groups A to D on the basis of the SOC of the battery 12. As an example, the group A is a vehicle including the battery 12 having an SOC of 75% or more and 100% or less. The group B is a vehicle including the battery 12 having an SOC of 51% or more and 74% or less. The group C is a vehicle including the battery 12 having an SOC of 26% or more and 50% or less. The group D is a vehicle including the battery 12 having an SOC of 0% or more and 25% or less.

The vehicle 10 classified into the group A indicates a vehicle available for traveling. The vehicle 10 classified as the group A is also a vehicle including the battery 12 having a remaining battery amount usable for a decrease demand response (DR). The vehicle 10 belonging to the group B is a vehicle including the battery 12 having a remaining battery amount usable mainly for the decrease DR. The vehicle 10 classified into the group C is a vehicle mounted with the battery 12 having a remaining battery amount usable mainly for both the decrease DR and an increase DR. The vehicle 10 belonging to the group D is a vehicle including the battery 12 having a remaining battery amount available mainly for the increase DR.

FIG. 11 illustrates groups classified on the basis of the combination of the SOC of the battery 12 and the power consumption rate of the user of the vehicle 10. The vehicle 10 is classified into any of eight groups based on the combination of four groups based on the SOC of the battery 12 and two groups based on the power consumption rate of the user. In the example of FIG. 11, the power consumption rate is classified into two groups of a group in which the power consumption rate of the user is "excellent" and a group in which the power consumption rate of the user is "poor". The group in which the power consumption rate is "excellent" is a group in which the power consumption rate is higher than a predetermined threshold, and the group in which the power consumption rate is "poor" is a group in which the power consumption rate is lower than the predetermined threshold. As the predetermined threshold, an average value of power consumption rates of the plurality of users or the like can be applied.

In each group, it is predetermined whether the vehicle 10 classified into each group can be used for the decrease DR or the increase DR after being used by the user. For example, it is determined that the vehicle 10 of which the SOC is within the range of the group A is available for the decrease DR regardless of the group of the power consumption rate. It is determined that a group in which the SOC is within the range of the group B and the power consumption rate is "excellent" is available for the decrease DR. It is determined that a group in which the SOC is within the range of the group B and the power consumption rate is "poor" is available for the increase DR. It is determined that a group in which the SOC is within the range of the group C and the power consumption rate is "excellent" is available for the decrease DR. It is determined that a group in which the SOC is within the range of the group C and the power consumption rate is "poor" is available for the increase DR. It is determined that the vehicle 10 of which the SOC is within the range of the group D is available for the increase DR regardless of the group of the power consumption rate.

Note that as described with reference to FIG. 10, the vehicle 10 of which the SOC is within the range of the group B is mainly used for the decrease DR. However, when the user of which the power consumption rate is "poor" uses the vehicle, there is a possibility that the SOC of the battery 12 becomes lower than a predicted SOC after use. For this reason, it is assumed that the vehicle 10 belonging to the group in which the SOC is within the range of the group B and the power consumption rate is "poor" is available for the increase DR. However, it is assumed that a priority that the vehicle 10 which belongs to the group is used for the increase DR is lower than a priority that the vehicle 10 which belongs to another group determined to be usable for the increase DR is used for the increase DR.

The selection module 330 classifies the vehicle 10 into any of the above-described eight groups on the basis of the reservation information of the user and the predicted SOC after the vehicle 10 is used by the user. When the power plan is confirmed in the integrated management apparatus 50, the selection module 330 selects which vehicle 10 is to be used for power transfer from/to the office 30 on the basis of whether the decrease DR is planned or the increase DR is planned by the power plan.

For example, in the example illustrated in FIG. 9, it is planned that the battery 12 is used for the decrease DR for the peak cut of the office 30 according to the power plan. In this case, the selection module 330 selects the vehicle 10 belonging to the group determined to be used for the decrease DR as the vehicle to be used for the peak cut of the office 30. As an example, it is assumed that the vehicle 10b belongs to a group in which the predicted SOC of the battery 12b is within the range of the group C and the power consumption rate of the user B is "excellent", and the vehicle 10c belongs to a group in which the predicted SOC is within the range of the group C and the power consumption rate of the user C is "poor". In this case, the selection module 330 selects, as the vehicle which can supply electrical power to the office 30, the vehicle 10b, which is not scheduled to be used in the peak cut period, from among the vehicles 10 belonging to the group for which the decrease DR is determined.

In this manner, since the selection module 330 classifies the vehicles 10 into a plurality of groups on the basis of the reservation information and the combination of the power consumption rate of the user and the SOC, whether the vehicle 10 can be used for the increase DR or the decrease DR can be specified with a simple calculation. As a result, the selection module 330 can select the vehicle 10 to be used for power transfer from/to the office 30 from among the vehicles classified into a specific group determined depending on whether the increase DR or the decrease DR is scheduled according to the power plan. For this reason, it is possible to reduce the calculation load for searching for the vehicle 10 to be used for power transfer.

As described above, according to the system 5 of the present embodiment, the vehicle 10 to be used for the peak cut or the like of the office 30 can be selected on the basis of the driving characteristic of the user. For this reason, the amount of electrical power consumed by the driving of the vehicle 10 can be considered appropriately, and thus it is possible to increase a possibility that a necessary amount of power transfer can be performed between the power grid and the battery.

Figure 12:
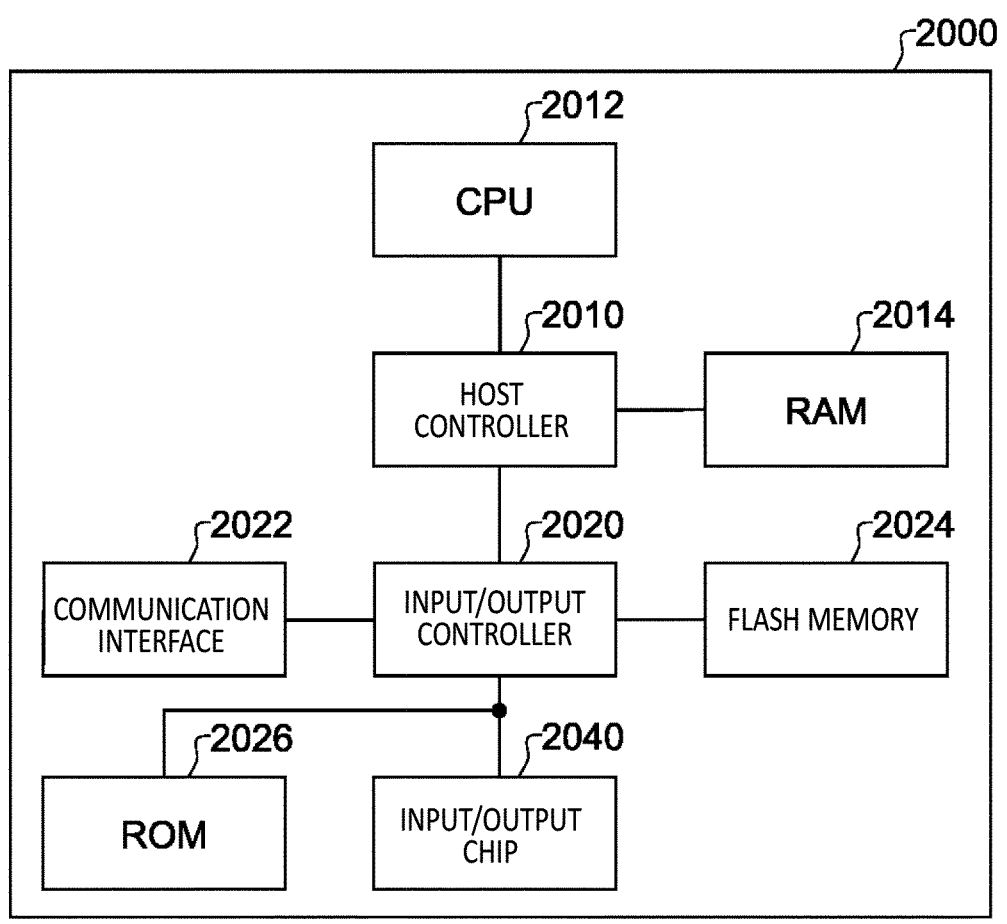
FIG. 12 illustrates an example of a computer 2000.

FIG. 12 illustrates an example of a computer 2000 in which a plurality of embodiments of the present invention may be entirely or partially embodied. A program installed in the computer 2000 can cause the computer 2000 to function as the system 5 or each module of the system 5, or an apparatus such as the power control apparatus 40 and the vehicle management apparatus 60 or each module of the apparatus according to the embodiment and to execute an operation associated with the system or each module of the system, or the apparatus or each module of the apparatus, and/or execute a process or a step of the process according to the embodiment. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources described above. A device or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and write back a result into the RAM 2014. In addition, the CPU 2012 may search for information in a file, a database, or the like in the recording medium. For example, when multiple entries, each having an attribute value of a first attribute associated with an attribute value of a second attribute, is stored in the recording medium, the CPU 2012 may search for an entry having a designated attribute value of the first attribute that matches a condition from the multiple entries, and read the attribute value of the second attribute stored in the entry, thereby obtaining the attribute value of the second attribute associated with the first attribute that satisfies a predetermined condition.

The programs or software modules explained above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

The program installed in the computer 2000 to cause the computer 2000 to function as the integrated management apparatus 50 may work on the CPU 2012 or the like to cause the computer 2000 to function as each module of the integrated management apparatus 50. The information processing described in these programs is read by the computer 2000 to function as each module of the integrated management apparatus 50 which is a specific means in which software and the above-described various hardware resources cooperate. Then, when calculation or processing of information according to the use purpose of the computer 2000 in the present embodiment is realized by these specific means, the unique integrated management apparatus 50 according to the use purpose is constructed.

The program installed in the computer 2000 to cause the computer 2000 to function as the vehicle management apparatus 60 may work on the CPU 2012 or the like to cause the computer 2000 to function as each module of the vehicle management apparatus 60. The information processing described in these programs is read by the computer 2000 to function as each module of the vehicle management apparatus 60 which is a specific means in which software and the above-described various hardware resources cooperate. Then, when calculation or processing of information according to the use purpose of the computer 2000 in the present embodiment is realized by these specific means, the unique vehicle management apparatus 60 according to the use purpose is constructed.

Various embodiments have been explained with reference to the block diagrams and the like. In the block diagrams, each block may represent (1) a stage of a process in which an operation is executed, or (2) each module of the device having a role in executing the operation. A specific stage and module may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means for executing processing procedures or operations specified in the block diagrams. An example of the computer-readable storage medium may include an electronic storage medium, a magnetic storage medium, an optical storage medium, an electromagnetic storage medium, or a semiconductor storage medium. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EE-PROM), a static random access memory (SRAM), a compact disk read only memory (CD-ROM), a digital versatile disk (DVD), a Blu-ray (registered trademark) disk, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instructions may be provided to a processor of a general purpose computer, a special purpose computer, or other programmable data processing device, or to programmable circuit, locally or via a local area network (LAN), wide area network (WAN) such as the Internet, and a computer-readable instruction may be executed to provide means for executing operations specified in the explained processing procedures or block diagrams. Examples of the processor include a computer processor, a processing unit, a microprocessor, a digital signal processor, a controller, a microcontroller, and the like.

While the present invention has been described by way of the embodiments, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

5: system;
10: vehicle;
12: battery;
30, 31: office;
40, 41: power control apparatus;
50, 51: integrated management apparatus;
60, 61: vehicle management apparatus;
70: power consumer;
80: power generation apparatus;

90: power grid;
140: power control apparatus;
180: server;
190: communication network;
200: processing module;
210: acquisition module;
220: planning module;
280: storage module;
290: communication module;
300: processing module;
310: acquisition module;
311: first acquisition module;
312: second acquisition module;
320: arbitration module;
330: selection module;
380: storage module;
390: communication module;
500, 510, 520, 601, 602, 603, 604, 605, 606, 607, 608, 609, 610, 617, 618, 619, 620, 701, 702, 703, 704, 707, 708, 709, 710, 720: reference numeral;
2000: computer;
2010: host controller;
2012: CPU;
2014: RAM;
2020: input/output controller;
2022: communication interface;
2024: flash memory;
2026: ROM; and
2040: input/output chip.

What is claimed is:

1. A system comprising:
a first acquisition module which acquires information indicating a driving-scheduled period of a plurality of vehicles each including a battery and a driving characteristic of a driver who drives each of the plurality of vehicles in the driving-scheduled period;
a second acquisition module which acquires information indicating a power transfer-scheduled period during which power transfer is to be performed between the battery included in at least one vehicle of the plurality of vehicles and a power grid; and
a selection module which specifies, on a basis of the driving-scheduled period, the driving characteristic, and the power transfer-scheduled period, a driving characteristic of a driver of a vehicle to be driven within a predetermined period from the power transfer-scheduled period, and selects, on a basis of the driving characteristic being specified, a vehicle of which a battery is used for power transfer from/to the power grid.

2. The system according to claim 1, wherein the driving characteristic includes a power consumption rate of the battery acquired when the driver drives the vehicle.

3. The system according to claim 2, wherein the driving characteristic includes the power consumption rate acquired for each combination of the driver and a vehicle type.

4. The system according to claim 3, wherein the driving characteristic includes the power consumption rate acquired for each combination of the driver and a day of week.

5. The system according to claim 3, wherein the driving characteristic includes the power consumption rate acquired for each combination of the driver and a travel route of the vehicle.

6. The system according to claim 3 wherein
the driving characteristic includes the power consumption rate acquired for each combination of the driver and the plurality of vehicles.

7. The system according to claim 3, wherein
the selection module selects the vehicle of which the battery is used for the power transfer on a basis of the power consumption rate and whether to perform power supply from the battery to the power grid or to perform power supply from the power grid to the battery in the power transfer-scheduled period.

8. The system according to claim 2, wherein
the driving characteristic includes the power consumption rate acquired for each combination of the driver and a day of week.

9. The system according to claim 8, wherein
the driving characteristic includes the power consumption rate acquired for each combination of the driver and a travel route of the vehicle.

10. The system according to claim 8 wherein
the driving characteristic includes the power consumption rate acquired for each combination of the driver and the plurality of vehicles.

11. The system according to claim 8, wherein
the selection module selects the vehicle of which the battery is used for the power transfer on a basis of the power consumption rate and whether to perform power supply from the battery to the power grid or to perform power supply from the power grid to the battery in the power transfer-scheduled period.

12. The system according to claim 2, wherein
the driving characteristic includes the power consumption rate acquired for each combination of the driver and a travel route of the vehicle.

13. The system according to claim 12 wherein
the driving characteristic includes the power consumption rate acquired for each combination of the driver and the plurality of vehicles.

14. The system according to claim 12, wherein
the selection module selects the vehicle of which the battery is used for the power transfer on a basis of the power consumption rate and whether to perform power supply from the battery to the power grid or to perform power supply from the power grid to the battery in the power transfer-scheduled period.

15. The system according to claim 2 wherein the driving characteristic includes the power consumption rate acquired for each combination of the driver and the plurality of vehicles.

16. The system according to claim 2, wherein
the selection module selects the vehicle of which the battery is used for the power transfer on a basis of the power consumption rate and whether to perform power supply from the battery to the power grid or to perform power supply from the power grid to the battery in the power transfer-scheduled period.

17. The system according to claim 16, wherein
the selection module further selects, as the vehicle which performs the power supply from the battery included in the vehicle to the power grid, a vehicle to be driven by a driver having the power consumption rate lower than a predetermined value, and selects, as a period during which the power supply is performed from the battery included in the vehicle to the power grid, a period after the driver having the power consumption rate lower than the predetermined value ends driving the vehicle.

18. The system according to claim 16, wherein
the selection module further selects, as the vehicle which performs the power supply from the power grid to the battery included in the vehicle, a vehicle to be driven by a driver having the power consumption rate higher than a predetermined value, and selects, as a period during which the power supply is performed from the power grid to the battery included in the vehicle, a period after the driver having the power consumption rate higher than the predetermined value ends driving the vehicle.

19. A method comprising:
acquiring information indicating a driving-scheduled period of a plurality of vehicles each including a battery and a driving characteristic of a driver who drives each of the plurality of vehicles in the driving-scheduled period;
acquiring information indicating a power transfer-scheduled period during which power transfer is to be performed between the battery included in at least one vehicle of the plurality of vehicles and a power grid; and
specifying, on a basis of the driving-scheduled period, the driving characteristic, and the power transfer-scheduled period, a driving characteristic of a driver of a vehicle to be driven within a predetermined period from the power transfer-scheduled period, and selects, on a basis of the driving characteristic being specified, a vehicle of which a battery is used for power transfer from/to the power grid.

20. A non-transitory computer-readable storage medium having recorded thereon a program that causes a computer to function as:
a first acquisition module which acquires information indicating a driving-scheduled period of a plurality of vehicles each including a battery and a driving characteristic of a driver who drives each of the plurality of vehicles in the driving-scheduled period;
a second acquisition module which acquires information indicating a power transfer-scheduled period during which power transfer is to be performed between the battery included in at least one vehicle of the plurality of vehicles and a power grid; and
a selection module which specifies, on a basis of the driving-scheduled period, the driving characteristic, and the power transfer-scheduled period, a driving characteristic of a driver of a vehicle to be driven within a predetermined period from the power transfer-scheduled period, and selects, on a basis of the driving characteristic being specified, a vehicle of which a battery is used for power transfer from/to the power grid.

* * * * *